US008615477B2

(12) United States Patent
Smith et al.

(10) Patent No.: US 8,615,477 B2
(45) Date of Patent: Dec. 24, 2013

(54) MONITORING RELATIONSHIPS BETWEEN DIGITAL ITEMS ON A COMPUTING APPARATUS

(75) Inventors: Gregory Robert Smith, Bellevue, WA (US); Amy Kathleen Karlson, Bellevue, WA (US); Bongshin Lee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 12/795,666

(22) Filed: Jun. 8, 2010

(65) Prior Publication Data

US 2011/0302113 A1    Dec. 8, 2011

(51) Int. Cl.
*G06F 15/173* (2006.01)
(52) U.S. Cl.
USPC .............................................. 706/12
(58) Field of Classification Search
USPC ..................... 706/12, 47; 709/224
See application file for complete search history.

(56) References Cited

U.S. PATENT DOCUMENTS

| 2005/0120333 A1 | 6/2005 | Inoue et al. |
| 2008/0270450 A1 | 10/2008 | Veitch et al. |
| 2009/0171867 A1* | 7/2009 | Bilenko et al. .................. 706/12 |
| 2009/0307345 A1* | 12/2009 | Carter et al. .................. 709/224 |

OTHER PUBLICATIONS

Ames, et al., "LIFS: An Attribute-rich File System for Storage Class Memories", Retrieved at << http://users.soe.ucsc.edu/~elm/Papers/msst06.pdf >>, In Proceedings of the 23rd IEEE / 14th NASA Goddard Conference on Mass Storage Systems and Technologies, May 2006, pp. 1-14.
Policroniades-Borraz, Calicrates., "Decomposing File Data into Discernible Items", Retrieved at << http://www.cl.cam.ac.uk/techreports/UCAM-CL-TR-672.pdf >>, Technical Report UCAM-CL-TR-672, Aug. 2006, pp. 1-230.
Amer, Ahmed., "Mobile Hoarding and Dynamic Grouping", Retrieved at << http://www.usenix.org/publications/login/2001-04/pdfs/amer.pdf >>, vol. 26, No. 2, Apr. 2001, pp. 76-79.
Amer, et al., "Dynamic Relationships and the Persistence of Pairings", Retrieved at << http://ieeexplore.ieee.org/stamp/stamp.jsp?tp=&arnumber=918751 >>, 21st International Conference on Distributed Computing Systems Workshops (ICDCSW '01), Apr. 16-19, 2001, pp. 502-507.
Ganger, et al., "Self-* Storage", Retrieved at << http://www.pdt.cmu.edu/ftp/News/newsletter03.pdf >>, 2003, pp. 1-34.

(Continued)

*Primary Examiner* — Jeffrey A Gaffin
*Assistant Examiner* — Ola Olude Afolabi
(74) *Attorney, Agent, or Firm* — Medley, Behrens & Lewis, LLC

(57) ABSTRACT

Systems and methods are described herein that facilitate file management on a computing device and/or across multiple computing devices. Actions of a user with respect to digital items on a computing device can be monitored and utilized to build a relationship table, wherein the relationship table comprises identities of digital items and data that describes relationships between particular digital items. Such a relationship table is analyzed to provide a user with information pertaining to relationships between digital items captured in the relationship table. Relationship tables from different devices can be merged to analyze relationships between digital items across devices.

20 Claims, 12 Drawing Sheets

(56) References Cited

OTHER PUBLICATIONS

Vishwanath, et al., "Intelligent File Management in Ubiquitous Environments", Retrieved at << http://www.csee.umkc.edu/~leeyu/Publications/cpaper05-1.pdf >>, Symposium on Applied Computing, Proceedings of the 2005 ACM symposium on Applied computing, Mar. 13-17, 2005, pp. 1-5.

Amer, et al., "Aggregating Caches: A Mechanism for Implicit File Prefetching", Retrieved at << http://ieeexplore.ieee.org/stamp/stamp.jsp?tp=&arnumber=948880 >>, MASCOTS, Proceedings of the Ninth International Symposium in Modeling, Analysis and Simulation of Computer and Telecommunication Systems, Aug. 15-18, 2001, pp. 293-301.

Bao, et al., "Fewer Clicks and Less Frustration: Reducing the Cost of Reaching the Right Folder", Retrieved at << http://eecs.oregonstate.edu/TaskTracer/papers/iui06Bao.pdf >>, International Conference on Intelligent User Interfaces, Proceedings of the 11th international conference on Intelligent user interfaces, Jan. 29-Feb. 1, 2006, pp. 1-8.

Bellotti, et al., "Taking Email to Task: The Design and Evaluation of a Task Management Centered Email Tool", Retrieved at << http://www.sigchi.org/chi2003/docs/takingemail.pdf >>, Conference on Human Factors in Computing Systems, Proceedings of the SIGCHI conference on Human factors in computing systems, Apr. 5-10, 2003, pp. 1-8.

Dourish, et al., "Presto: An Experimental Architecture for Fluid Interactive Document Spaces", Retrieved at http://citeseerx.ist.psu.edu/viewdoc/download?doi=10.1.1.94.1461&rep=rep1&type=pdf >>, ACM Transactions on Computer-Human Interaction (TOCHI), vol. 6, No. 2, Jun. 1999, pp. 1-24.

Dragunov, et al., "TaskTracer: A Desktop Environment to Support Multi-tasking Knowledge Workers", Retrieved at << http://citeseerx.ist.psu.edu/viewdoc/download?doi=10.1.1.73.7987&rep=rep1&type=pdf >>, International Conference on Intelligent User Interfaces, Proceedings of the 10th international conference on Intelligent user interfaces, Jan. 10-13, 2005, pp. 75-82.

Freeman, et al., "Lifestreams: A Storage Model for Personal Data", Retrieved at << http://portal.acm.org/ft_gateway.cfm?id=381893&type=pdf >>, ACM SIGMOD Record, vol. 25, No. 1, Mar. 1996, pp. 80-86.

Gyllstrom, Karl., "Passages through Time: Chronicling Users' Information Interaction History by Recording When and What They Read", Retrieved at http://portal.acm.org/ft_gateway.cfm?id=1502673&type=pdf >>, International Conference on Intelligent User Interfaces, Proceedings of the 13th international conference on Intelligent user interfaces, Feb. 8-11, 2009, pp. 147-156.

Jones, et al., "The Personal Project Planner: Planning to Organize Personal Information", Retrieved at << http://portal.acm.org/ft_gateway.cfm?id=1357162&type=pdf >>, Conference on Human Factors in Computing Systems, Proceeding of the twenty-sixth annual SIGCHI conference on Human factors in computing systems, Apr. 5-10, 2008, pp. 681-684.

Kaptelinin, Victor., "UMEA: Translating Interaction Histories into Project Contexts", Retrieved at http://portal.acm.org/ft_gateway.cfm?id=642673&type=pdf&coll=GUIDE&dl=portal,ACM&CFID=73840110&CFTOKEN=54865805 >>, Conference on Human Factors in Computing Systems, Proceedings of the SIGCHI conference on Human factors in computing systems, Apr. 5-10, 2003, pp. 353-360.

Lonsdale, Heather., "Using Provenance to Aid Document Re-finding", Retrieved at << http://ir.library.oregonstate.edu/jspui/bitstream/1957/11910/1/HNL_Thesis_061009.pdf >>, Jun. 8, 2009, pp. 1-69.

Oliver, et al., "Swish: Semantic Analysis of Window Titles and Switching History", Retrieved at http://portal.acm.org/ft_gateway.cfm?id=1111492&type=pdf&coll=GUIDE&dl=GUIDE&CFID=83867749&CFTOKEN=95267465 >>, International Conference on Intelligent User Interfaces, Proceedings of the 11th international conference on Intelligent user interfaces, Jan. 29-Feb. 1, 2006 pp. 194-201.

Pedersen, et al., "Relating Documents via user Activity: the Missing Link", Retrieved at >> http://portal.acm.org/ft_gateway.cfm?id=1378837&type=pdf&coll=GUIDE&dl=GUIDE&CFID=83868160&CFTOKEN=28403789 >>, International Conference on Intelligent User Interfaces, Proceedings of the 13th international conference on Intelligent user interfaces, Jan. 13-16, 2008, pp. 389-392.

Shah, et al., "Using Provenance to Aid in Personal File Search", Retrieved at << http://www.hpl.hp.com/personal/Craig_Soules/papers/usenix07.pdf >>, USENIX Annual Technical Conference on Proceedings of the USENIX Annual Technical Conference, Jun. 17-22, 2007, pp. 1-14.

Smith, et al., "Groupbar: The Taskbar Evolved", Retrieved at << http://research.microsoft.com/en-us/um/redmond/groups/cue/publications/ozchi2003-groupbar.pdf >>, In Proceedings of OZCHI, 2003, pp. 1-10.

Tang, et al., "Recent Shortcuts: using Recent Interactions to Support Shared Activities", Retrieved at http://portal.acm.org/ft_gateway.cfm?id=1240816&type=pdf&coll=GUIDE&dl=GUIDE&CFID=83868278&CFTOKEN=76502673 >>, Conference on Human Factors in Computing Systems, Proceedings of the SIGCHI conference on Human factors in computing systems, Apr. 28-May 3, 2007, pp. 1263-1272.

Voida, et al., "WikiFolders: Augmenting the Display of Folders to Better Convey the Meaning of Files", Retrieved at << http://grouplab.cpsc.ucalgary.ca/grouplab/uploads/Publications/Publications/2008-WikiFolders.Report2008-913-26.pdf >>, Conference on Human Factors in Computing Systems, Proceedings of the 27th international conference on Human factors in computing systems, Apr. 4-9, 2009, pp. 1-4.

* cited by examiner

| ITEM ID 1 | RELATIONSHIP TYPE | ITEM ID 2 |
|---|---|---|
| ITEM ID1 | RELATIONSHIP TYPE | ITEM ID 3 |
| ITEM ID 3 | RELATIONSHIP TYPE | ITEM ID 4 |

FIG. 9

| SEARCH FIELD 902 | | | |
|---|---|---|---|
| NAME | ASSOCIATED EMAILS | ASSOCIATED URLS | ASSOCIATED FILES |
| FILE 1 | EMAIL DATA | URL 1 | FILE X |
| FILE 2 | | URL 2 | |
| FILE 3 | | | FILE Y |
| 904 | 906 | 908 | 910 |

900

MONITORING RELATIONSHIPS BETWEEN DIGITAL ITEMS ON A COMPUTING APPARATUS

BACKGROUND

Performing a task on a computing apparatus often involves generating, duplicating, modifying, transmitting, or performing other tasks on numerous digital items. In an example, an individual may wish to retrieve a photograph from a digital camera, make modifications to such photograph, transmit the photograph to a separate computing device, and thereafter email the photograph to an acquaintance. Thus, the individual may initially download the photograph from the web page, generate a copy of such photograph and place it in a different folder, access the photograph, modify the photograph, place the photograph on a portable flash drive, insert that flash drive into a laptop computing apparatus, attach the modified photograph to an email, and thereafter cause the email to be transmitted to an identified acquaintance of the individual. A few weeks or months later, the same individual may wish to email the same file to another acquaintance, but is unsure of which version is the version that was previously emailed and where that version is located. Furthermore, the individual may forget that he or she emailed the photograph in the first place. Accordingly, it can be ascertained that managing relationships between digital items on a computing apparatus is a complicated task, especially when performed manually by an individual or based upon memory of the individual.

Compounding the problem of file management is the ever increasing storage that is available on modern computing devices, and the continuously decreasing cost of such storage. Because of this massive amount of data storage capacity, people have little incentive to delete or archive data. The practical cost of maintaining various copies and versions of different digital items across multiple folders and devices, however, may be relatively high. That is, an ability of an individual to find a particular file, or relationships between such files, is compromised due to the digital clutter that is created by maintaining all of such different types of digital items in various locations. Conventionally, individuals must meticulously maintain a manually created file organization system so that they can efficiently locate digital items and understand relationships between the digital items (e.g., files grouped together in a folder are in some way related). These human-generated file organization systems, however, often break down under massive amounts of data, and individuals often do not strictly comply with their own organization systems. Furthermore, users are often limited to a hierarchical organizational model that embodies only one way of organizing data, and are not necessarily appropriate for all user purposes.

Modern file management systems have been configured to help individuals locate particular digital items by maintaining various types of searchable metadata about the digital items including name, location, creation/modification date, etc. For instance, when looking for a most recent version of a file, an individual may search for the file by entering a term in the title of the file or in the contents of the file, and the results can be sorted by modification date, creation date, etc. This approach, however, is subject to failure if a system depends on human consistency in encoding versions into file names, co-locating related files in a folder hierarchy, or remembering a fragment of text that is guaranteed, when utilized to perform a search, to return a most recent version of a file without returning too many files. Deliberate or inadvertent user action can result in files being moved, renamed, or modified in ways that can easily cause these search and organization strategies to fail. Additionally, conventional file management systems are generally restricted to a personal computer of a user, and are currently not configured to help organize digital items that are not resident upon the personal computer. The problem with respect to management of digital items, however, is not restricted to a personal computer, and can span typical physical devices (which may be more than one device) and items sent off of a computer device (e.g., visits to web pages, items emailed out of a personal computer, . . . ).

SUMMARY

The following is a brief summary of subject matter that is described in greater detail herein. This summary is not intended to be limiting as to the scope of the claims.

Described herein are various technologies pertaining to managing relationships between digital items on a computing apparatus or across different computing apparatuses. As will be described in greater detail herein, user interaction with respect to digital items on a computing apparatus can be monitored, and such interaction can be utilized to generate/maintain a relationship table that represents relationships amongst different digital items. As used herein, digital items can be files (such as word processing documents, spread sheet documents, image files, video files, etc.), URLs that identify certain web pages, emails between a sender and a recipient, amongst other digital items. The relationship table can include identities of digital items and relationship data that describes the relationship between such digital items. Relationships that can be monitored between digital items include but are not limited to the following: saving a file under a different name, copying a file to a different location, copying and pasting text from one digital item to another, uploading/downloading a file to/from a particular web site, transmitting a file via email, etc. Other more granular relationships can also be captured, including having two digital items open at the same time, sequence data that describes a sequence of user interaction with respect to various digital items, temporal data that indicates an amount of time between two different actions undertaken with respect to digital files by an individual, etc. This relationship table can be built such that it can be represented by a graph, wherein nodes can represent digital items existent in the relationship table and edges can represent relationships between digital items in the relationship table.

Pursuant to an example, the relationship table can be utilized to provide a visualization of relationships between digital items to an individual, wherein such visualization may be in a graph-like format. For instance, the individual may focus on a particular digital item, such as a file. A visualization may then be provided to the individual, where the visualization can indicate that the file was previously downloaded from a particular website, emailed to a particular recipient from the individual, modified, uploaded to another website, and the modified version of the file exists in a different folder.

As more and more relationships are captured with respect to digital items, however, such relationship graph visualization may become too large and complicated to provide value to an individual. Thus, a machine learning algorithm can be executed over at least a portion of the relationship table to provide higher level aggregations of the relationship table, and thus provide information pertaining to digital items and relationships therebetween that is useful to the individual. For instance, current context pertaining to a digital item or set of digital items and one or more individual actions can be considered when generating an inference pertaining to the digital item or set of digital items being focused upon by the individual. Pursuant to an example, the individual may select a file and may attach the file to an email for transmittal. The relationship table can be analyzed, and it can be ascertained that the individual is sending a version of the file that is not the most recent version. The generated inference can pertain to believing that the individual would wish to transmit the most recent version of the file via email. A notification may then be presented to the individual that informs the individual that the file selected for transmittal via email is not the most recent version of the file, and can point the individual to a most recent version of the file.

Still further, the relationship table described herein can be utilized to manage file relationships across different devices. For example, many individuals today have multiple computing devices, including a desktop computer, a laptop computer, a portable telephone that is capable of viewing digital items, amongst other computing devices. Each of these apparatuses may be configured to generate relationship tables that monitor actions undertaken by an individual with respect to digital items on the respective computing apparatuses. These multiple computing apparatuses may then share their respective relationship tables with one another. Portions of the relationship tables can be aligned such that substantially similar digital items across relationship tables (and computing apparatuses) can be identified, and relationships amongst and between digital items across computing devices can be ascertained. For instance, an individual may generate a file on a desktop device and make alterations to that file. The individual may then transmit the file by email to herself and access such file on her laptop computing device. The individual may then modify the file on the laptop computing device while traveling for business. Upon returning home, the individual may attempt to access the file on the desktop computing device. Upon selecting the file, since the desktop computing device has the relationship table generated at the laptop computing device, it can be determined that a more recent version of the file exists on the laptop computing device. Accordingly, aspects described herein pertain to utilizing these relationship tables to perform cross-device file management.

These and other aspects will be appreciated upon reading and understanding the attached figures and description.

BRIEF DESCRIPTION OF THE DRAWINGS

FIGS. 5-10 are example visualizations that can be generated through utilization of relationship tables.

DETAILED DESCRIPTION

Figure 1:
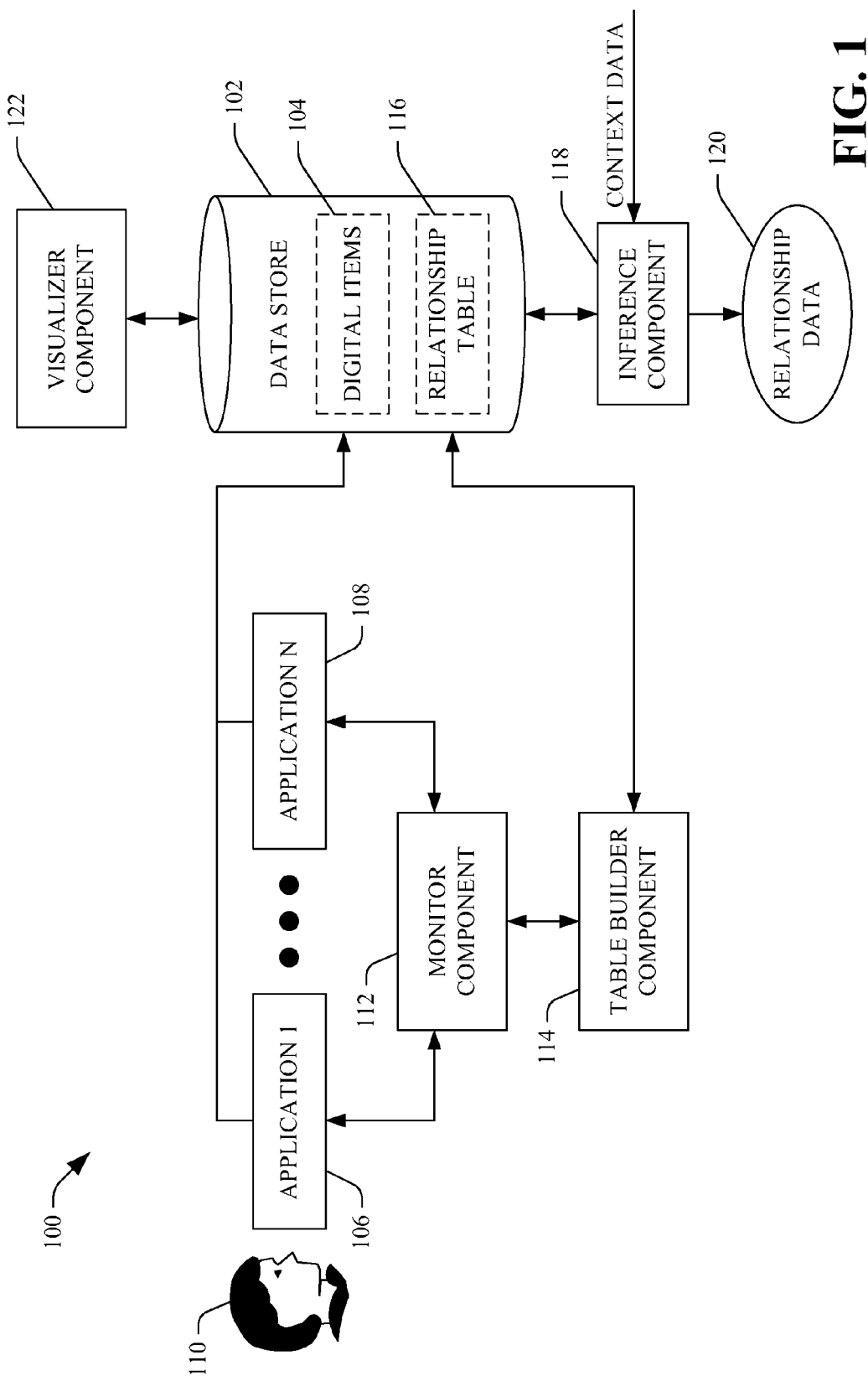
FIG. 1 is a functional block diagram of an example system that facilitates generating a relationship table pertaining to digital items on a computing apparatus.

Various technologies pertaining to digital item management on a computing apparatus or across computing apparatuses will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates management of digital items on a computing apparatus and/or across separate computing apparatuses is illustrated. The system 100 includes a data store 102 that retains digital items 104 on a computing device. These digital items 104 may be, but are not limited to being, digital files (such as word processing files, spreadsheet files, presentation files, image files, audio files, video files, executables, etc.), web pages, emails, etc. Digital items 104 may be created, modified, accessed, etc. by a plurality of computer executable applications 106-108 that can be executed on a computing apparatus. These applications can be word processing applications, spreadsheet generation/modification applications, video generating applications, a web browser, an email client, etc. A user 110 can utilize the applications 106-108 to create, modify, access, etc. the digital items 104 in the data store 102.

A monitor component 112 can be configured to monitor interaction of the user 110 with respect to the digital items 104 stored in the data store 102. That is, the monitor component 112 can monitor use of the applications 106-108 by the user 110 with respect to the digital items 104. Therefore, the monitor component 112 can determine if the user 110 has utilized the application 106 to obtain a digital item in the digital items 104, can monitor the application 108 to determine that the user 110 has caused the application 108 to modify the digital item in the digital items 104, etc. Pursuant to an example, the monitor component 112 can be configured to hook into the applications 106-108, thereby causing the applications 106-108 to report actions to the monitor component 112. In another example, the monitor component 112 can be configured as being a portion of an operating system that is utilized to control computing resources with respect to the applications 106-108. In such a scenario, the applications 106-108 can automatically report to the monitor component 112 based upon their implementation with respect to the operating system. A hybrid approach is also contemplated, such that some applications will automatically report to the monitor component 112, while the monitor component 112 is hooked into other applications that execute on the computing apparatus.

A table builder component 114 is in communication with the monitor component 112 and can build a relationship table 116 based at least in part upon the interaction of the user 110 with respect to the digital items 104 monitored by the monitor component 112. The relationship table 116 built by the builder component 114 is configured to identify digital items and relationships between digital items. Pursuant to an example, the table builder component 114 can build the relationship table 116 such that each row of the relationship table 116 includes an identifier that identifies a particular digital item, an identifier that identifies another digital item, and data that identifies a relationship between these two digital items. Thus, for example, a first digital item may be a first version of a file, and a second digital item may be a second version of the file. The relationship data can indicate that the user 110 used a particular application to modify the first version of the digital file to create the second version of the digital file and save the second version of the digital file as a new file. Additional exemplary details pertaining to building the relationship table 116 are provided in detail below.

As can be ascertained, as the monitor component 112 monitors more granular relationships and as files are maintained on a computing apparatus over time, the relationship table 116 may include relationships that are not relevant to the user 110 in certain contexts. That is, mechanically traversing the relationship table 116 to display relationships between digital items to the user 110 may become cumbersome and provide the user 110 with superfluous relationship information. Accordingly, the system 100 can include an inference component 118 that is configured to access the data store 102 and execute one or more machine learning algorithms over the relationship table 116 to generate at least one inference pertaining to a relationship corresponding to at least one digital item being focused upon by the user 110. For example, the user 110 can focus on a digital item by selecting such digital item. In another example, the user 110 can focus on a digital item by performing some action with respect to the digital item, such as attaching a file to an email, uploading a digital item, etc. Still further, the user 110 can focus on the particular digital item by hovering over the digital item or performing some other action with respect to the digital item of interest to the user 110. Still further, the user 110 can focus on a set of items such as those within a particular folder, or the set of currently open items. The inference component 118 may utilize the set of items as an input, and can perform one or more acts of inference utilizing the set of items as the input.

The inference component 118 may utilize any suitable machine learning algorithm or function learned by way of a machine learning algorithm to generate the inference. These include, but are not limited to, support vector machines, artificial neural networks, Bayesian networks, classifiers, a k-nearest-neighbor algorithm, or other suitable machine learning algorithms. Furthermore, the inference component 118 can consider contextual data when outputting relationship data 120 that pertains to the inference. This contextual data can include data such as: recent actions undertaken on the computing device by the user 110, recent actions pertaining to the digital file being focused upon by the user 110, the user's history of interaction with digital files on the computing device, time of day, day of week, or other data that may indicate how the user 110 wishes to interact with the focused-upon digital item.

The inference component 118 can be configured to execute the machine learning algorithm over the relationship table 116 prior to the user 110 focusing upon a digital item or set of digital items or after the user is deemed to be focusing on the digital item or set of digital items. That is, the inference component 118 can be configured to execute a machine learning algorithm to aggregate the relationship table 116 to emphasize meaningful relationships that exists in such relationship table 116. In other words, the relationship table 116 can be mined by the inference component 118 to automatically create/organize a relationship graph into higher-level aggregations of items that are more natural for the user 110 to work with directly. Thus, when the user 110 focuses on a particular item, the inference component 118 can follow various links existing in the relationship table 116, weighting different relationships according to learned metrics, and can produce assistance to the user 110 with respect to a task being performed by the user 110. For instance, if the user 110 attaches a document to an email, the inference component 118 can output the relationship data 120 which suggests that there is a more recent version of the document in a different location on the computing apparatus. In another example, when the user 110 has a question about a particular digital item, the inference component 118 can produce a (potentially coalesced) visualization of related digital items, according to the context of the question from the user 110. For instance, the user can see which version of a file was uploaded to an online data repository. The inference component 118 can also crawl the relationship table 116 opportunistically, analyzing the relationship table 116 for higher level aggregations, and potentially reorganizing digital items to anticipate needs or requests of the user 110. For instance, by detecting patterns of simultaneous access between digital items, the inference component 118 can determine that a particular digital item may be desirably located in a folder where several related digital items already exist.

Still further, the inference component 118 can be updated through active learning, such that as the actions of the user 110 change over time, the inferences output by the inference component 118 represent desires of the user 110. Therefore, the inference component 118 can receive feedback data that indicates how the user 110 is interacting with digital items on the computing apparatus, and inferences can be updated based at least in part upon the feedback data.

The system 100 further comprises a visualizer component 122 that can cause relationships captured in the relationship table 116 to be visualized to the user 110 upon a request for such visualization from the user 110. As will be shown and described in detail below, such visualization may be in the form of a graph that represents relationships between digital items, wherein the digital items can be represented by nodes, and relationships therebetween can be represented by links (or edges) between the nodes. The nodes can be labeled to indicate a type of digital item, and the edges can be labeled to indicate a type of relationship between digital items. Additionally or alternatively, the visualizer component 122 can be configured to visualize relationships in a tabular manner. Therefore, for instance, the visualizer component 122 can cause a digital item to be visually represented, and can present visual representations of other digital items that are related to the digital item.

Still further, and as will be described in greater detail herein, the visualizer component 122 can be configured to visualize cross-device relationships between digital items. For example, many people have various computing devices that they utilize to review, modify, create, and transmit digital items. The visualizer component 122 can be configured to visualize relationships captured in relationship tables across these different computing devices.

Generation of the relationship table 116 will now be described in greater detail. As indicated above, the monitor component 112 can be configured to monitor the applications 106-108 to detect actions of the user 110 with respect to the digital items 104. Example actions that can be monitored and captured by the monitor component 112 include, but are not limited to, the following: downloading a file from a particular web page, saving a copy of a file at a different location (a "save as" operation), copying text or images from a first digital item and placing them in a second digital item, having two digital items open at the same time (e.g., having a word processing document open together with a particular web page), accessing digital items in a particular sequence (first opening a first file, and thereafter opening a second file), temporal data that indicates an amount of time between accessing and/or modifying different digital items, uploading a digital item to a particular web page (e.g., uploading an image to a social networking web page), attaching a digital item to an email, transmitting the email to a particular recipient, downloading a digital file from an email, receiving a digital file by way of an instant message application, amongst various other actions the user 110 can undertake with respect to digital items on the computing apparatus through utilization of the applications 106-108.

More detail pertaining to the table builder component 114 will now be provided. As described previously, the table builder component 114 can receive these actions undertaken with respect to certain digital items, as well as relationships between such digital items monitored by the monitor component 112, and can generate the relationship table 116 based at least in part upon the data monitored by the monitor component 112. Pursuant to an example, when the monitor component 112 monitors actions taken with respect to certain digital items, the monitor component 112 can generate or identify unique identifiers corresponding to such digital items. For instance, this can be referred to as an item ID, which is a low-level identifier selected from within a particular domain that is appropriate for tracking individual items at certain granularities of operation. For example, the monitor component 112 can output a 64-bit file reference number for a file in a particular file system volume (e.g., NTFS file system volume). This reference number is unique within the volume, does not change when a file is moved around a hierarchy and/or renamed, yet can be used to quickly access current path and properties of a file. In another example, the monitor component 112 can determine that the user 110 has generated an email using an MAPI-compliant email system, and the monitor component 112 can output a conversation index property, which is a hexadecimal string created for each new email which encodes a conversation relationship to prior messages in the thread.

The table builder component 114 can receive such item ID and generate a namespace ID. A namespace ID is a string representing the name space within which the item ID has meaning, and which can be used to resolve a reference to a digital item at runtime. For instance, on an NTFS file volume, there is a globally unique volume identifier within which each individual file reference number is unique. As another example, in a particular email system a store identifier is a variable-length hexadecimal string identifying a particular user and mail store within which individual email item references can be located. Furthermore, for a web page, the namespace ID can identify a protocol corresponding to the web page (e.g., "http").

The third part of an identifier that can be built by the table builder component 114 can be referred to as a location ID, which can be a string that represents the owner and authority for the accompanying name space ID. The location ID can be utilized to locate the referenced digital item in its latest form. For example, this may be a network name or address of the machine on which a particular NTFS file volume is mounted, or which serves as a domain authority for email accounts. It can be ascertained that using such relatively long string volumes in literal form throughout the system 100 may be inefficient in terms of storage, transmission, and comparison between identifiers. Accordingly, the table builder component 114 can create what can be referred to as a container globally unique identifier (GUID) to map each distinct location ID/namespace ID pair it encounters, and can store such mappings locally in a two-way container lookup-type table. The item ID may also be unbounded, but in contrast to the relatively small number of unique containers typically encountered on a given system, the number of individual items within such containers may be in the hundreds of thousands or more, making a mapping table infeasible. Instead, the table builder component 114 can hash the item ID to a 16-byte item ID hash, via some hashing algorithm such as MD5. MD5 has some useful properties, including efficiency to calculate, a low probability of two different item IDs yielding a substantially similar item ID hash, and yet different systems 100 can always independently calculate the same item ID hash for a given item ID. Other hashing algorithms, however, are also contemplated.

An item ID hash can be combined by the table builder component 114 with a 16-byte container GUID for a total composite local item reference size of 32 bytes, which can be convenient for storing, transmitting, and comparing. Of course, the table builder component 114 can utilize other suitable methods for uniquely identifying digital items, such that they can be referenced in the relationship table 116, and these other methods are contemplated and intended to fall under the scope of the hereto-appended claims.

Figures 2, 3:
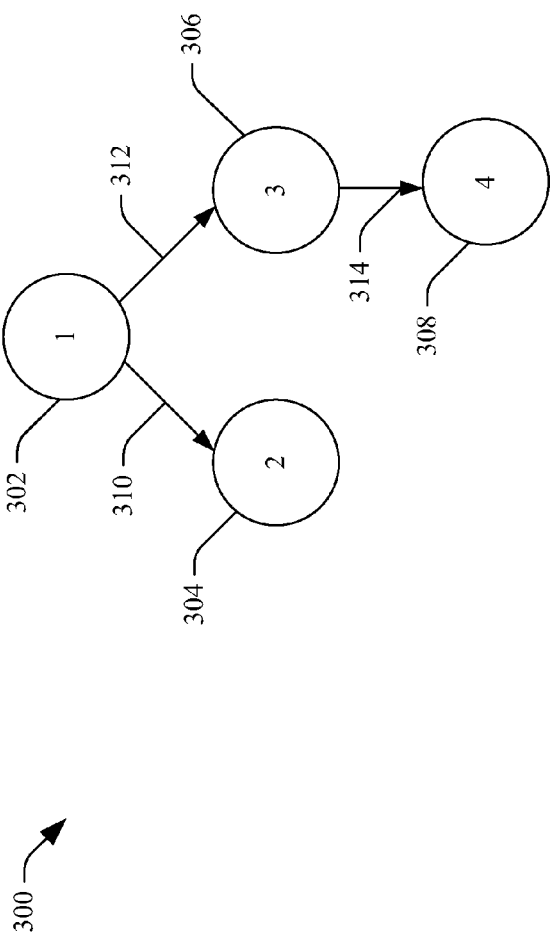
FIG. 2 illustrates an example relationship table.
FIG. 3 illustrates an example graph pertaining to the relationship table of FIG. 2.

With reference now to FIG. 2, an example relationship table 200 is illustrated. This example relationship table 200 comprises three separate columns. A first column 202 comprises identities of digital items. These identities can be identities that were created as described above. Thus, for example, the first item identity can represent a word processing document, and the second item identity can represent a particular web page. A second column 204 of the relationship table 200 comprises data that indicates a relationship type between two digital items. Such relationship type can include data such as "upload," "download," "save as," etc. A third column 206 of the relationship table 200 comprises identities digital items that are related to digital items identified in the first column 202. Therefore, by analyzing a row of the relationship table 200, it can be ascertained that a first digital item is related to a second digital item by way of a relationship described in the relationship data in the second column 204. For instance, the first digital item may be a word processing document that is downloaded from a web page (the second digital item). Going to the second row of the relationship table 200 indicates that the first digital item is related to a third digital item. For instance, the relationship data in the second column 204 corresponding to this row may have indicated the user performed a "save as" operation on the word processing document and created a copy of word processing document in a different location. Thus, the third digital item is a more recent version of the first digital item. Looking at the third row of the relationship table 200 indicates that the third digital item is somehow related to a fourth digital item. For instance, the fourth digital item may be a social networking web page, and the user may have uploaded the third digital item to the social networking web page.

Referring now to FIG. 3, an example graph 300 that corresponds to the relationship table 200 is illustrated. The example graph 300 comprises nodes 302, 304, 306 and 308 that correspond to the entries in the first and third columns 202 and 206 of the relationship table 200, respectively (FIG. 2). The graph 300 also comprises edges 310, 312 and 314 that correspond to entries in the second column 204 of the relationship table 200. For example, the first node 302 can represent the a first word processing document, the second node 304 can represent a first web page, the third node 306 can represent a second word processing document, and the fourth node 308 can represent a second web page. The edge 310 can represent a relationship between the first word processing document and the first web page; for instance, the first word processing document may have been downloaded from the first web page. A user may then modify the first word processing document and perform a "save as" operation to create the second word processing document. The edge 312 can represent the "save as" relationship between the first word processing document and the second word processing document. The user may have then uploaded the second word processing document to the second web page. The edge 314 can represent such relationship between the second word processing document and the second web page (e.g., an upload relationship).

Figure 4:
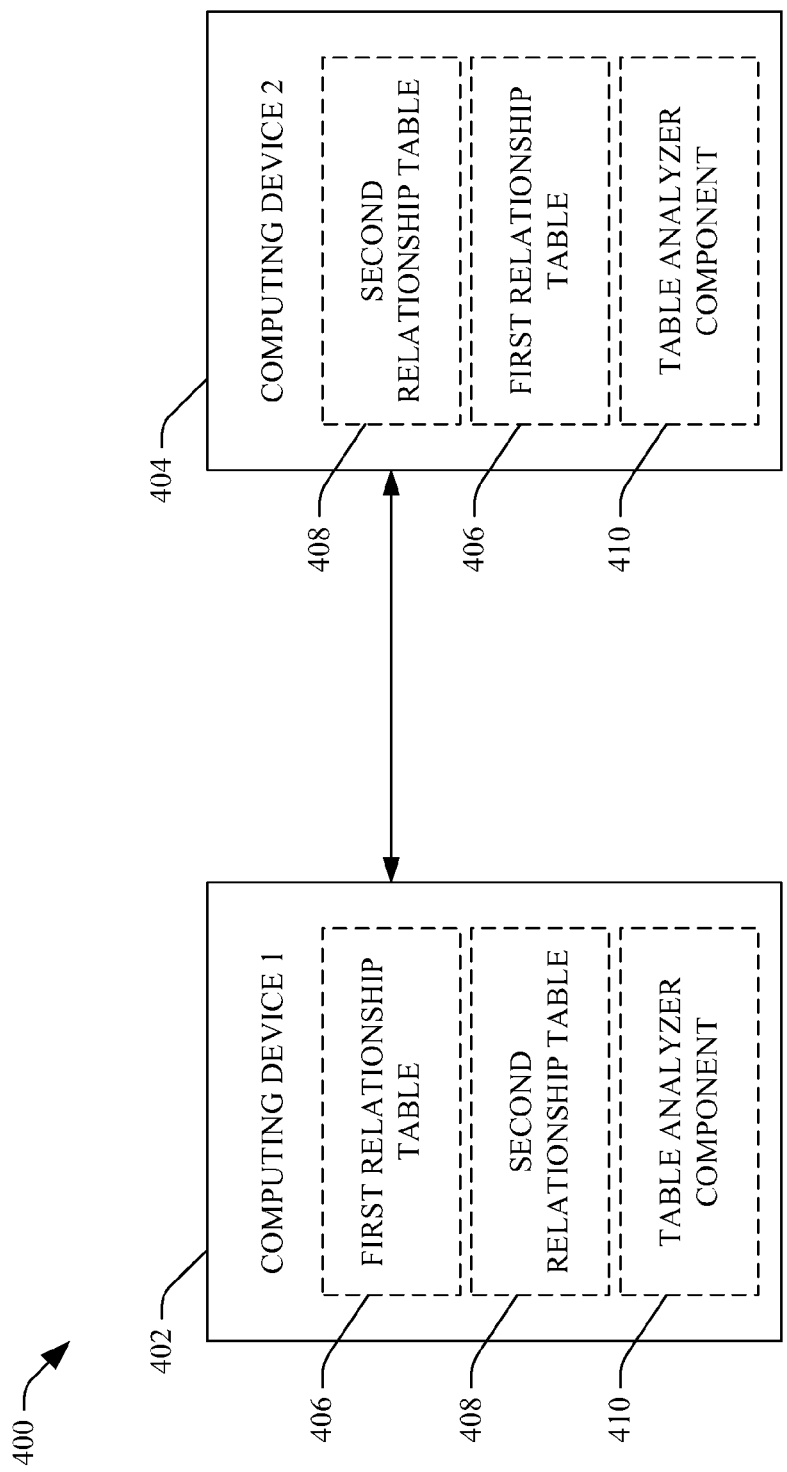
FIG. 4 is a functional block diagram of an example system that facilitates performing cross-device file management through utilization of relationship tables.

Referring now to FIG. 4, an example system 400 that facilitates cross-device file management is illustrated. For purposes of explanation, the system 400 is shown as including two computing devices that are in direction communication with one another, such as a portable computing device being synchronized with a desktop computer. It is to be understood that other forms of synchronization are contemplated and are intended to fall under the scope of the hereto-appended claims. For example, a cloud service may act as an intermediary third party, such that two or more devices can be synchronized by way of the cloud service without being simultaneously online. The system 400 comprises a first computing device 402, which can be a personal computing device, a portable computing device such as a laptop computer or a mobile telephone, or other suitable computing device. The first computing device 402 can be associated with a second computing device 404, which can be a personal computing device, a portable computing device such as a laptop computer or a portable telephone, etc. For instance, at least for a relatively small amount of time, the first computing device 402 and the second computing device 404 can be directly or indirectly in communication with one another. The first and second computing devices 402 and 404 may be in communication be way of a peer-to-peer network, for example. In another example, the first computing device 402 and the second computing device 404 can be owned by a same individual, and can be synced by way of some suitable connection, including a USB connection, a Bluetooth connection, etc. Still further, the computing devices 402 and 404 can be connected by way of some network such as a local area network, a wide area network, etc.

The first computing device 402 includes a first relationship table 406 that identifies relationships between digital items residing on the first computing device 402. Such relationship table has been described in detail above. Similarly, the second computing device 404 can include a second relationship table 408 that captures relationships between digital items residing on the second computing device. Again, this can be created as described above. When the first computing device 402 and the second computing device 404 are in communication, such computing devices can transmit the relationship tables 406 and 408 to one another if an indication is received that the user(s) of the first and second computing devices 406 and 408, respectively, have authorized the transmission of the relationship tables 406 and 408. Thus, as shown, the first computing device 402 can receive and retain the second relationship table 408, and similarly the second computing device 404 can receive and retain the first relationship table 406. The transmittal of relationship tables between two devices can occur, for instance, if and only if a user or users of the two computing devices 402 and 404 have authorized transmittal of such relationship tables.

For an individual that is the owner of both the first computing device 402 and the second computing device 404, such authorization may be prompted when the individual first syncs the first computing device 402 with the second computing device 404. If the computing devices 402 and 404 are owned/operated by different individuals, then authorization/creation of the relationship tables can be undertaken so as to preserve privacy of the individuals. For example, an individual corresponding to the first computing device 402 can be provided with an interface that allows the individual to select what types of relationships are tracked, what types of digital items are monitored, where on the computing apparatus digital items can be monitored, etc. A substantially similar process can be undertaken on the second computing device 404. Thus, if the first and second computing devices 402 and 404 are operated by two individuals that are collaborating on a project, the sharing of relationship tables can be limited to relationship data pertaining to such project.

Each of the first computing device 402 and the second computing device 404 can include a table analyzer component 410 that can analyze the first and second relationship tables 406 and 408 to perform cross-device file management. For instance, the identification scheme for identifying digital items described above includes a mechanism for utilizing a namespace pertaining to a digital item to identify such digital item. The table analyzer component 410 can search the identifiers for such name space, and can align the relationship tables 406 and 408 based at least in part upon common namespaces. Of course, other data that can be utilized to align entries of the relationship tables 406 and 408 are also contemplated. Thereafter, the table analyzer component 410 can essentially follow links existent in the relationship tables 406-408 to ascertain cross-device relationships between digital items.

Pursuant to an example, an individual may utilize the first computing device 402, which can be a personal computer, to generate a document. The individual may then create a second version of such document and store the second version in a particular folder. The individual may thereafter upload the second version of the document to an online data store. The online data store can have a web address corresponding thereto, which can be utilized in the namespace ID. The individual may then utilize the second computing device 404, which can be a laptop computer, to download the second version of the document from the online data store. The individual may thereafter make modifications to the document and save the modified version on the second computing device 404 as a third version. The individual may subsequently return to utilizing the first computing device 402, may search for the document on the first computing device 402, and can locate the first version of such document. Meanwhile, the first computing device 402 and the second computing device 404 can be synced such that the first computing device 402 includes both the relationship tables 406 and 408. Once the individual has located the first version of the document on the first computing device 402, the individual can be provided with data that indicates that an updated version (the third version) of the file exists on the second computing device 404. This can save time and effort, and the individual can quickly access the second computing device 404 to retrieve the most recent version of the document.

The system 400 can also be utilized in a collaborative environment, wherein a first individual is utilizing the first computing device 402 while a second individual is utilizing the second computing device 404. The first individual can create a document that he wishes for the individual in the second computing device 404 to review and edit. The first individual can save a copy of the document on the first computing device 402 (a second version of the document), and can transmit the second version via email to the second individual who utilizes the second computing device 404. The second individual may then download the second version from his email, open the second version, make modifications, and save the updated document on the second computing device 404 as a third version. Meanwhile, the first individual may wish to transmit the document on the first computing device to a third individual. The first individual, however, may see that the second individual has updated the document on the second computing device 404 to generate a third version, and may therefore wait to transmit the document to the third individual until the updated version is received from the second individual utilizing the second computing device 404. Other applications of cross-device file management are contemplated, will be understood by one of ordinary skill in the art, and are intended to fall under the scope of the hereto-appended claims.

Referring now collectively to FIGS. 5-10, various visualizations that can be provided in connection with the file management capabilities described above are illustrated. These visualizations are merely exemplary in nature, and one of ordinary skill in the art will understand that these visualizations may take various forms to convey relationships between digital items to users.

Figure 5:
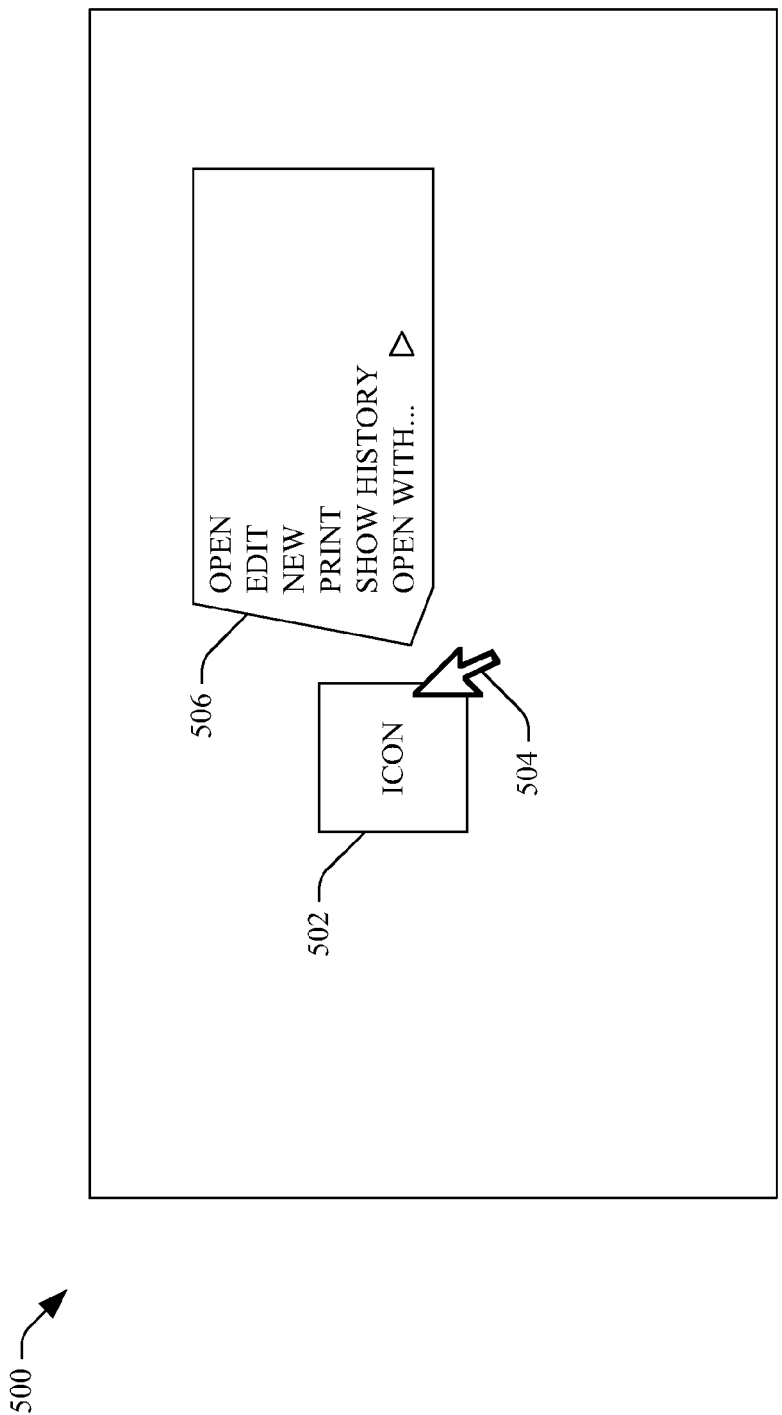

Referring solely to FIG. 5, an example graphical user interface 500 is illustrated. The graphical user interface 500 includes a graphical icon 502 that corresponds to a particular digital item, such as a word processing document, a spreadsheet document, etc. An individual may utilize a mouse pointer 504 to point to the icon 502. For instance, upon right-clicking the icon 502 and/or hovering over the icon 502 with the mouse pointer 504, a menu window 506 can be presented to the individual, wherein the menu field includes a plurality of selectable options. Many of the options presented to the individual may be conventional, such as "open . . . ," "edit," "new," "print," and "open with . . . ". Additionally, the menu window 506 can include an option "show history . . . ". Selection of such option can provide the individual with details pertaining to the history of the digital item corresponding to the icon 502, including relationship data corresponding to the item. Such relationship data can indicate where the file came from, what other digital items are related to such digital item, etc.

Figure 6:
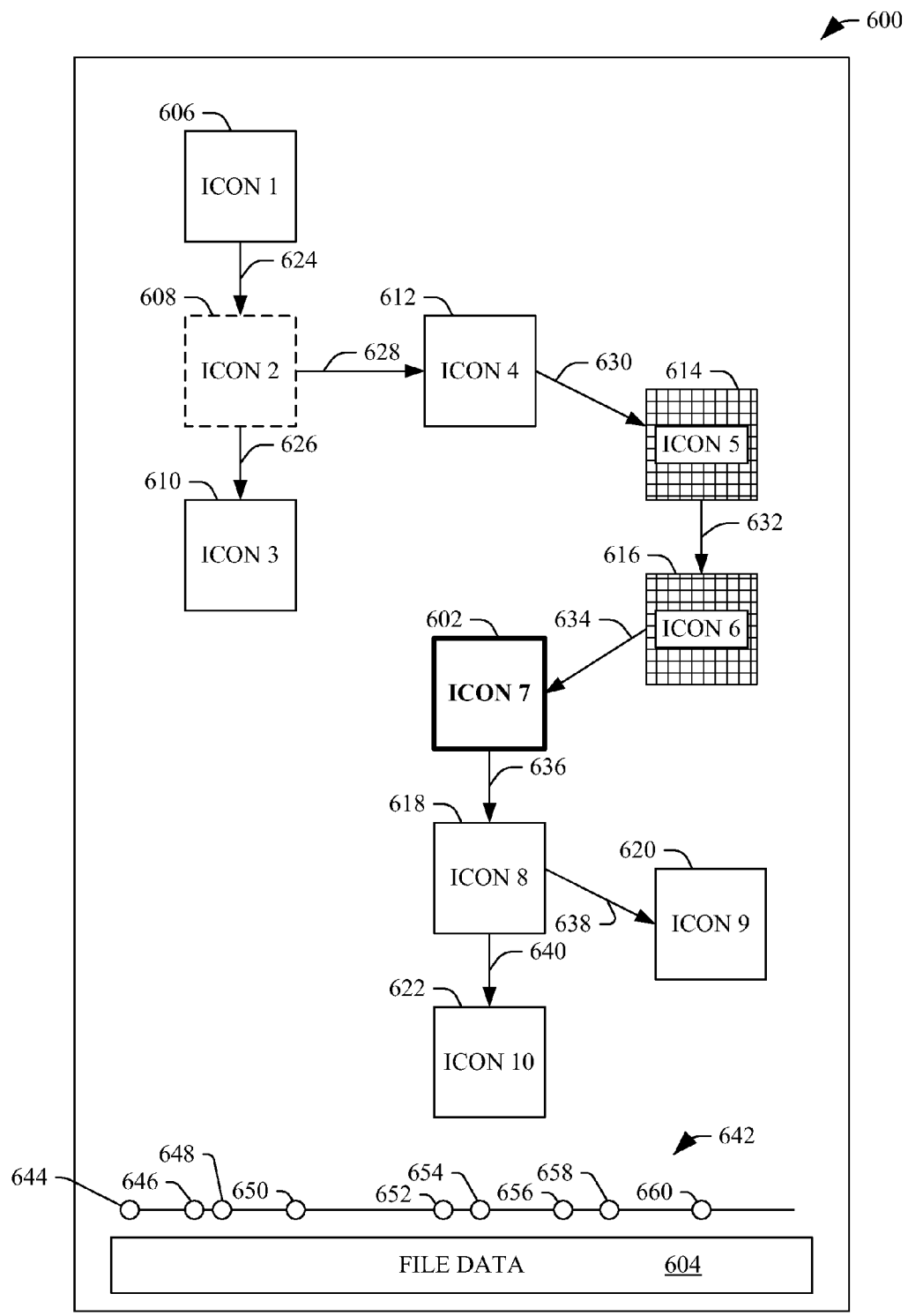

Referring now to FIG. 6, an example graphical user interface 600 that visually depicts the history of a digital item selected by an individual is illustrated. The graphical user interface 600 comprises an icon 602 that is highlighted to indicate that the icon corresponds to a digital item is being focused upon by the individual. The graphical user interface 600 can also comprise a file data field 604 that depicts information pertaining to the digital item focused upon by the individual. The file data field 604 can depict numerous types of data pertaining to the digital item, including type of digital item, name of the digital item, data pertaining to when the digital item was created or modified, size of the digital item, location of the digital item on a computing device, amongst other data. The graphical user interface 600 additionally comprises a plurality of other icons 606-622. Such icons 606-622 can represent various relationships between digital items related to the digital item represented by the icon 602.

Pursuant to a particular example, the icon 602 can represent a word processing document that is of interest to an individual. The graphical user interface 600 further comprises a plurality of edges 624-640. These edges can indicate relationships between graphical items represented by icons connected by such edges. Additionally, the edges 624-640 can be labeled to indicate a type of relationship that exists between digital items represented by the icons.

A particular example pertaining to relationships/history of a digital represented by the icon 602 will now be presented. This example is for the purposes of illustration, and is not intended to be limiting as to the scope of the hereto-appended claims. In this example, the icon 606 can represent a particular web page, and can be graphically depicted so that the individual viewing the icon 606 can understand that the icon 606 represents a web page. The icon 608 can represent a first word processing document, and again can be graphically depicted as representing a word processing document. The edge 624 can be labeled to indicate that the word processing document was downloaded from the web page represented by the icon 606. The icon 610 can represent a second version of the digital item, and the edge 626 can indicate that a "save as" operation was performed such that the first version of the word processing document represented by the icon 608 was saved as the second version of the word processing document represented by the icon 610. The icon 608 can be shown in such a manner to indicate that the digital item corresponding to the icon was placed in a recycle bin of the computing device or entirely deleted from the computing device (e.g., shown in a semi-transparent manner).

The icon 612 can represent a third version of the word processing document, and the edge 628 can indicate that a "save as" operation was performed on the first version of the word processing document represented by the icon 608 to create the third version of the word processing document. The icon 614 can also represent the third version of the word processing document, and can be depicted in such a manner to indicate that this third version resides on a second computing device. The edge 630 can indicate that this third version was transmitted to the second computing device via email. The icon 616 can represent a fourth version of the word processing document, which is an updated version of the third word processing document represented by the icon 614. The icon 616 can be depicted to indicate that the fourth word processing document resides on the second computing device. The edge 632 can indicate that a "save as" operation was performed on the version of the word processing document represented by the icon 614 to generate the fourth version of the word processing document.

The icon 602 represents the version (fourth version) of the word processing document being viewed by the user, and the edge 634 can indicate that this version was received via email from the second computing device. It can be ascertained that the icons 606-616 represent the history of the version of the word processing document being focused upon by the user, and the edges 624-634 indicate relationships that occurred during generation of this version of the word processing document.

From reviewing the visualization, however, it can be ascertained that other actions have been taken with respect to the word processing document represented by the icon 602. For example, the digital icon 618 can represent yet another version of the word processing document (a fifth version), and the edge 636 can be labeled to indicate that a "save as" operation was performed on the fourth version of the word processing document to generate the fifth version of the word processing document. The icon 620 can represent a particular web page, and the edge 638 can be labeled to illustrate to the individual that the fifth version of the word processing document (represented by the icon 618) was uploaded to the web page represented by the icon 620. The icon 622 can represent a different type of document (e.g., an image), and the edge 640 can inform the user of a translation process that caused the fifth version of the word processing document to be saved as the image represented by the icon 622.

Accordingly, pursuant to an example, the individual can view the history corresponding to the word processing document represented by the icon 602, and can quickly ascertain that a newer version of such word processing document exists on the computer, and that such newer version was uploaded to a web page represented by the icon 620. Furthermore, the individual can see that an image of this newest version of the digital item was created and is retained at a particular location of the computing device of the individual.

Furthermore, as alluded to above, the icons 602 and 606-622 can be provided with various graphical features to indicate details pertaining to digital items represented by the icons. For example, an icon may be shown as being semi-transparent to indicate that the individual has deleted the digital item corresponding to the icon. In another example, an icon can be displayed with graphical indicia to inform the user that a digital item corresponding to the icon resides on another computing device. The edges 624-640 pertaining to the icons 602 and 606-620 can be labeled with text, images, etc., to inform the individual of relationships between digital items represented by icons coupled by edges.

The graphical user interface 600 can further include a timeline 642 that can represent times associated with the actions represented by the edges 624-640. Specifically, various graphical items 644-660 can represent actions that correspond to the edges 624-640. The individual can select one of the graphical items 644-660 and be provided with additional details pertaining to the actions and/or digital items corresponding to the actions. For example, an edge and/or digital items can be highlighted in the graphical user interface 600 upon the individual selecting or moving the mouse over one of the graphical items 644-660.

From the graphical user interface 600 the individual can open digital items represented by the icons; for instance, by double-clicking a particular icon. That is, double-clicking the icon 602 can cause the digital item represented by such icon 602 to be opened in an appropriate application. For example, if the icon 620 represents a web page, the individual can double-click the icon 620 and cause a web browser to load the web page represented by the icon 620.

Figure 7:
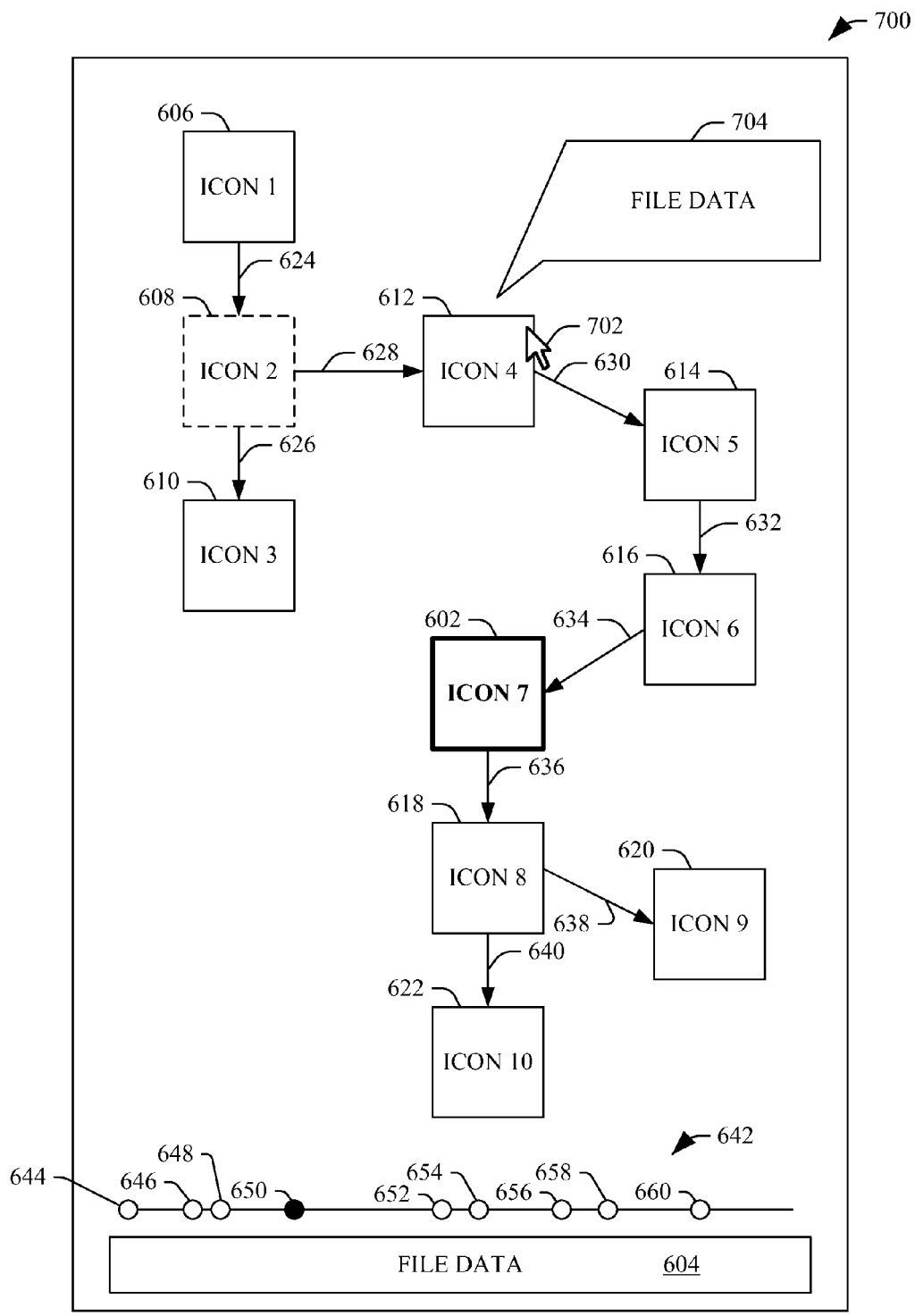

Referring now to FIG. 7, another example graphical user interface 700 is illustrated. In this example, the individual utilizes a mouse pointer 702 to hover over the icon 612. Upon hovering, a digital item data window 704 can be presented to the individual, wherein such window 704 comprises data pertaining to the digital item represented by the icon 612. This data can include the name of the digital item, the type of digital item, the location of the digital item (whether it is on the computing device or another computing device for which relationship tables have been received), time of creation of the digital item, time of modification of the digital item, size of the digital item, amongst other data pertaining to the digital item. Therefore, through the graphical user interface 700, the individual can quickly ascertain information about digital items related to a digital item of interest. Additionally, the graphical item 650 can he highlighted, which can provide the user with an indication of time of creation/modification of the digital item represented by the icon 612 with respect to other time of creation/modification of other digital items represented by icons displayed in the graphical user interface 700.

Figure 8:
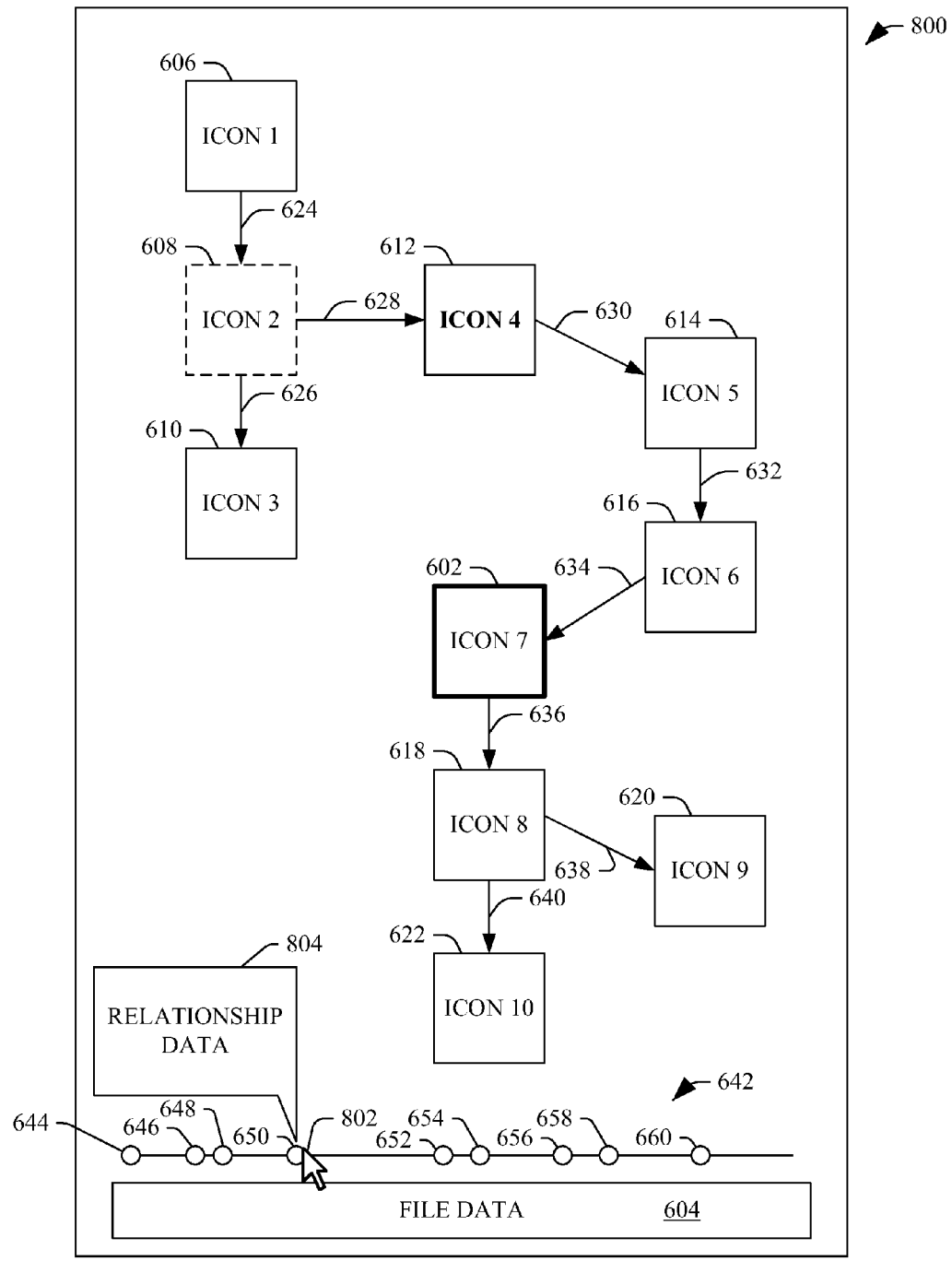

With reference now to FIG. 8, an example graphical user interface 800 is depicted. In this example interface 800, the individual may utilize a mouse pointer 802 to select or hover over the graphical item 650 in the timeline 642. This can cause a relationship data window 804 to be presented to the individual, wherein the relationship data window 804 comprises data pertaining to a certain relationship between digital items represented in the graphical interface 800. This relationship data can include time of the action that caused the relationship to occur, type of action that was undertaken, identity of the individual who undertook such action, etc. Additionally, an edge corresponding to the action represented by the graphical item 650 can be highlighted and/or an icon corresponding to the file represented by the graphical item 650 can be highlighted upon a hover over the graphical item 650 being selected. In the example graphical user interface 800, the graphical icon 612 is highlighted upon the user hovering over the graphical item 650.

Turning now to FIG. 9, another example user interface 900 is depicted. The graphical user interface 900 comprises a search field 902, wherein an individual may enter a query to search for particular files resident upon a computing device or resident upon a computing device that has shared relationship tables with the computing device of interest. The graphical user interface 900 can also include a plurality of columns 904-910. The first column 904 can be configured to present names of files to an individual. Such files can be in a particular folder, can be located across folders and found by undertaking a desktop search, etc.

The second column 906 can be configured to display email data is related to one or more of the files listed in the first column 904. Therefore, it can be ascertained that a first file was transmitted or received via an email described in the email data. This email data can include identity of a sender of an email, identity of a recipient of an email, time that an email was transmitted, subject of an email, and other data that may be associated with the email.

The third column 908 can be configured to display URLs that can be associated with the files listed in the column 904. Thus, for example, the first file may have a first URL associated therewith, such that the first file was downloaded from a web page corresponding to such URL. Similarly, the second file can have a URL associated therewith, such that the individual can quickly ascertain that the second file was uploaded to a web page identified by the URL. The associated URL data can include the identity of a web page, data indicating whether a file was uploaded to a web page or downloaded from a web page, etc.

The fourth column 910 can display files that are associated with the files in the column 904. Accordingly, it can be ascertained that the first file is some way related to file X, and a third file is in some way related to file Y. The fourth column 910 can include additional details pertaining to relationships between files, including type of relationship, time that the relationship was established, etc. The graphical user interface 900 can be combined, for instance, with graphical user interfaces shown in FIGS. 6-8. Therefore, for instance, by selecting one of the files, emails or URLs, a graphical use interface similar to those shown in FIGS. 6-8 can be presented to the user to display relationships between digital items with respect to the selected digital item.

These columns 904-910 can include data that can be searched over by the user to quickly locate information pertaining to a digital item of interest. For example, the individual may first wish to view all images that exist on a personal computing device. After such list is obtained, the individual may wish to ascertain which of these images was uploaded to a particular social networking site that is utilized by the individual. The individual may type in a name of a web page corresponding to the social networking site in the search field 902, and the search results can be presented in the graphical user interface 900.

Figure 10:
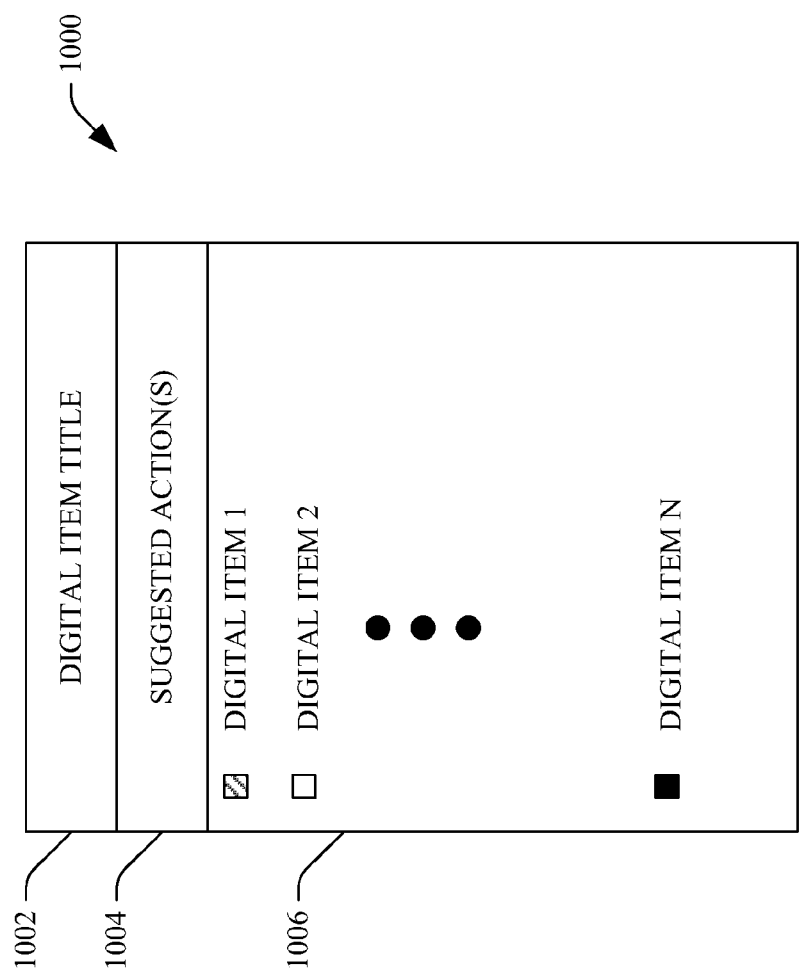

Referring now to FIG. 10, an example graphical user interface 1000 is illustrated. The graphical user interface 1000 can be utilized in connection with suggesting actions to be taken by a user given a certain context (e.g., a selection of an item or set of items). Pursuant to an example, an individual can select an item or set of items, and the graphical user interface 1000 can be provided to such user. The graphical user interface 1000 can be presented to the individual upon the individual selecting the item or set of items. The graphical user interface 1000 can comprise a first field 1002 that identifies a digital item or set of digital items (e.g., a folder) that has been selected by the individual. The graphical user interface 1000 also includes a second field 1004 that can include a suggested action or list of suggested actions for the individual to take. These actions can be suggested by way of performing inference using the selected item(s) as input.

The graphical user interface 1000 can also include a third field 1006 that includes a list of digital items that pertain to the suggested action(s) in the second field 1004. Pursuant to an example, the suggested action(s) can include opening, copying, deleting, moving, emailing, uploading, downloading, etc. For instance, the second field 1004 can include text such as "you may want to XXXX", where XXXX can include the aforementioned actions, and can refer to one or more of the digital items listed in the third field 1006. The suggested action(s) can include action(s) in addition to a recent action undertaken by the individual and/or action(s) that can be undertaken instead of a recent action undertaken by the individual.

Figure 11:
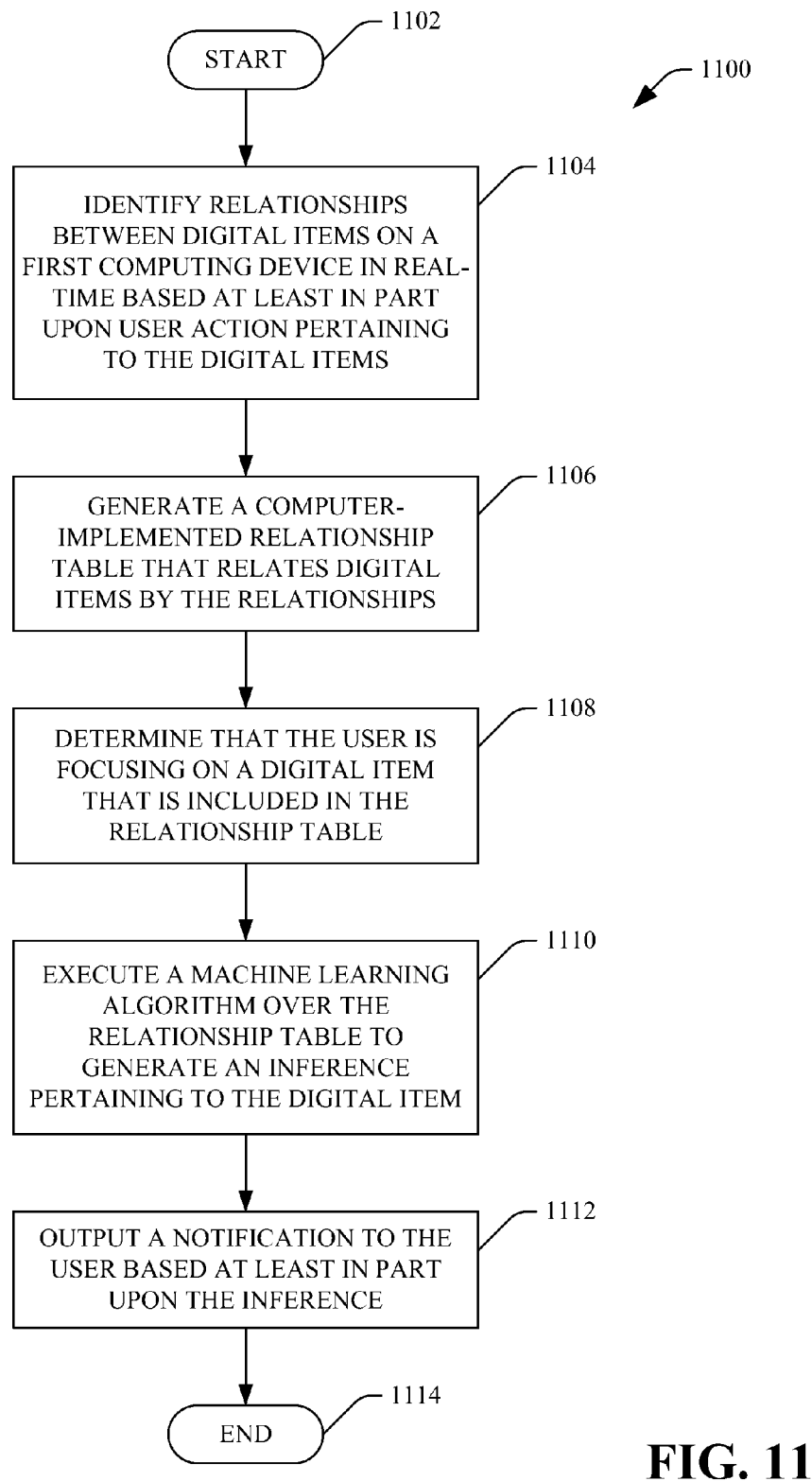
FIG. 11 is a flow diagram illustrating an example methodology for performing inference over a relationship table.
Figure 12:
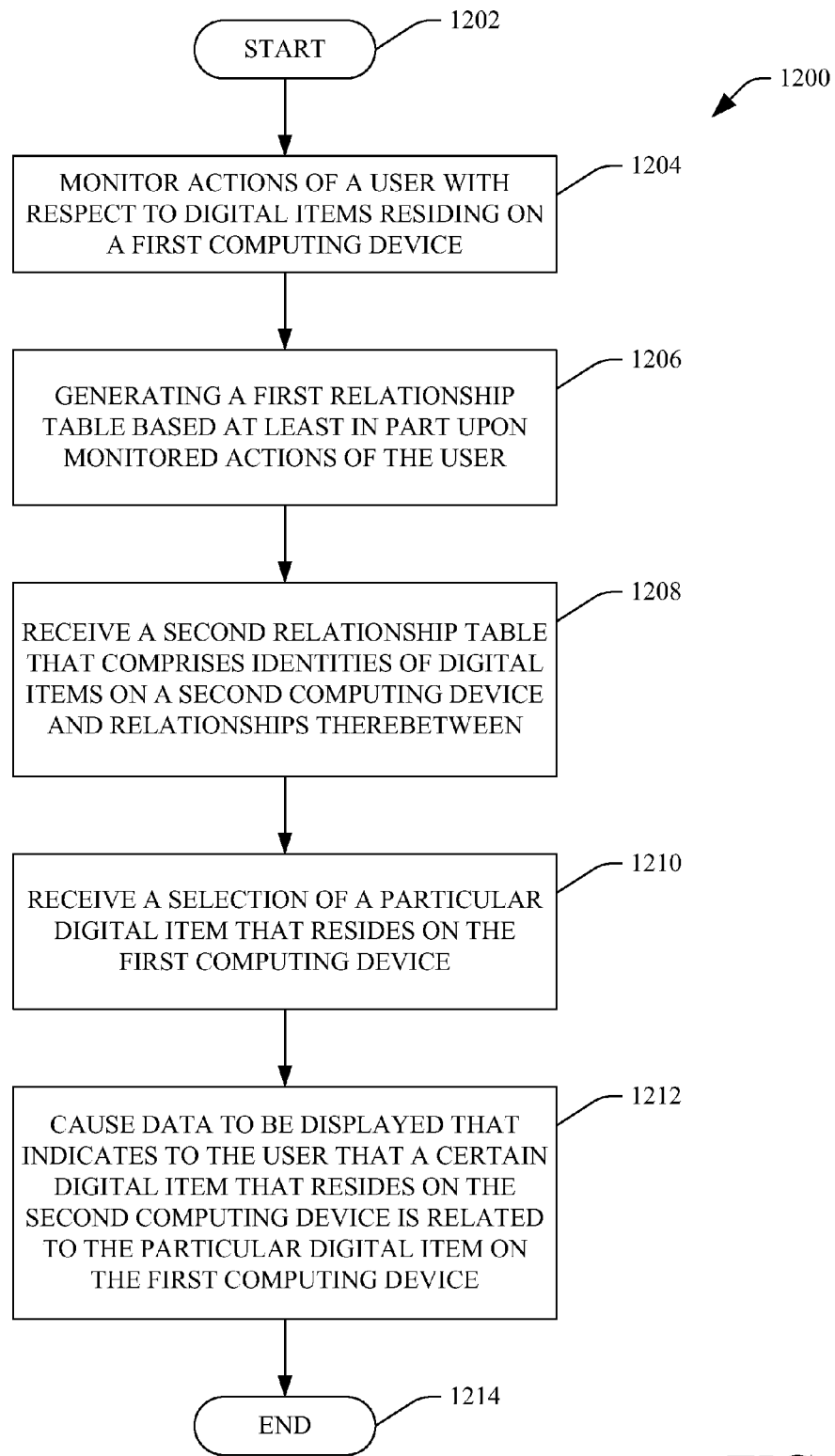
FIG. 12 is a flow diagram illustrating an example methodology for performing cross-device file management through utilization of relationship tables.

With reference now to FIGS. 11 and 12, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 11, a methodology 1100 that facilitates managing files on a computing device is illustrated. The methodology 1100 begins at 1102, and at 1104 relationships are identified between digital items retained on a first computing device in real time based in part upon user action pertaining to the digital items. Thus, as the user interacts with digital files on the computing device, relationships existent between digital items can be identified.

At 1106, a computer-implemented relationship table that relates digital items by such relationships that were identified in act 1104 is generated. As described above, this relationship table can include identities from two digital items, and how such digital items are related.

At 1108, a determination is made that the user is focusing on a digital item that is included in the relationship table. At 1110, a machine learning algorithm is executed over the relationship table to generate an inference pertaining to the digital item being focused upon by the user. This inference may be context-based, and can be utilized to provide information to the user that such user will find useful/important pertaining to the digital item.

At 1112, a notification is output to the user pertaining to the particular digital item being focused upon by the user based at least in part upon the inference generated at 1110. This notification can indicate to the user that a particular action may cause an undesired result (e.g., the last version of a document will be deleted). The methodology 1100 completes at 1114.

Referring now to FIG. 12, an example methodology 1200 that facilitates cross-computing device file management is illustrated. The methodology starts at 1202, and at 1204 actions of a user with respect to digital items residing on a first computing device are monitored. At 1206, a first relationship table is generated based at least in part upon the monitored actions of the user. This relationship table can include identities of digital items on the first computing device and relationships between digital items on the first computing device.

At 1208, a second relationship table is received that pertains to a second computing device, wherein the second relationship table comprises identities of digital items on the second computing device and relationships between the digital items on the second computing device.

At 1210, a selection of a particular digital item that resides in the first computing device is received. The selection can be a mouse-click, a hover, a right-click, etc. At 1212, data is caused to be displayed that indicates to the user that a certain digital item on the second computing device is related to the particular digital item that resides in the first computing device. This data can be displayed based at least in part upon a collective analysis of the first relationship table and the second relationship table. The methodology 1200 completes at 1214.

Figure 13:
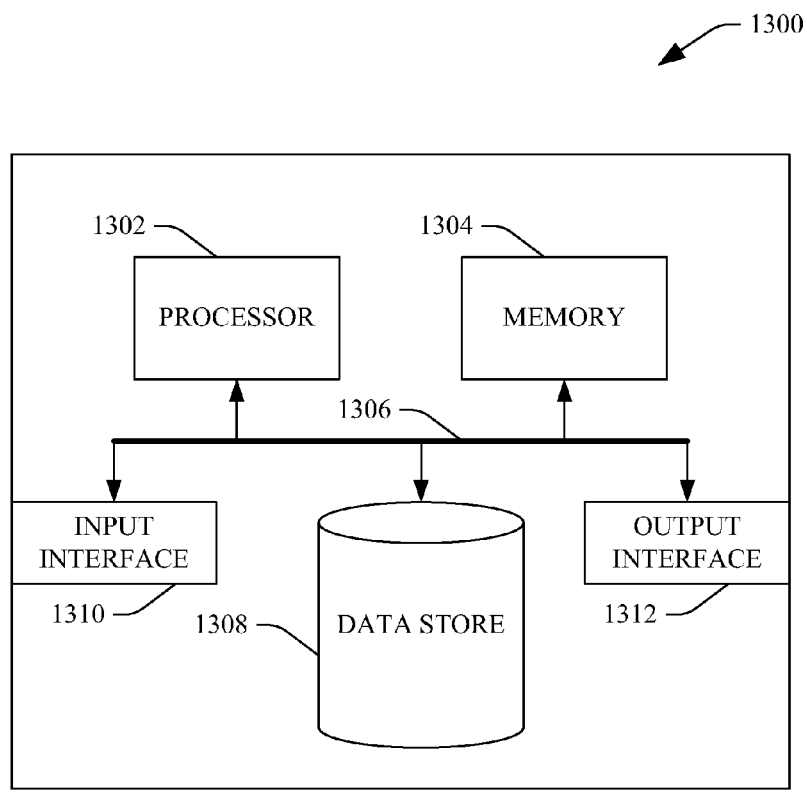
FIG. 13 is an example computing system.

Now referring to FIG. 13, a high-level illustration of an example computing device 1300 that can be used in accordance with the systems and methodologies disclosed herein is illustrated. For instance, the computing device 1300 may be used in a system that supports managing file relationships on a computing device. In another example, at least a portion of the computing device 1300 may be used in a system that supports cross-device file management. The computing device 1300 includes at least one processor 1302 that executes instructions that are stored in a memory 1304. The memory 1304 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store relationship tables, identities of digital items, identities of relationships, etc.

The computing device 1300 additionally includes a data store 1308 that is accessible by the processor 1302 by way of the system bus 1306. The data store 1308 may be or include any suitable computer-readable storage, including a hard disk, memory, etc. The data store 1308 may include executable instructions, digital items, relationship tables, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   identifying relationships between digital items retained on a first computing device in real-time based at least in part upon user action pertaining to the digital items;
   generating a first computer-implemented relationship table that relates different digital items by the relationships that have been identified;
   determining that the user is focusing on at least one digital item that is included in the relationship table;
   executing a machine learning algorithm over the relationship table with respect to the at least one digital item to generate an inference pertaining to the at least one digital item; and
   outputting a notification to the user pertaining to the at least one digital item based at least in part upon the generated inference.

2. The method of claim 1, wherein the digital items comprise files, web pages, and email documents.

3. The method of claim 1, wherein the relationships comprise saving a digital item under a new name, downloading a digital item from a web page, emailing a digital item to a particular email address, uploading a digital item, downloading a digital item, copying a digital item, deleting a digital item, having two digital items open at a same time, and copying content from a first digital item and pasting the content in a second digital item.

4. The method of claim 1, further comprising:
   receiving a second computer-implemented relationship table that comprises relationship data with respect to digital items residing on the second computing device; and
   analyzing the first computer-implemented relationship table and the second computer-implemented relationship table to ascertain that at least one relationship exists between at least one digital item residing on the second computing device and the particular digital item.

5. The method of claim 4, wherein the at least one digital item residing on the second computing device and the particular digital item are files, and wherein the at least one relationship indicates that the at least one digital item residing on the second computing device is an updated version of the particular digital item.

6. The method of claim 1, further comprising:
   receiving an indication that a second computing device that has been authorized by the user to receive the first relationship table is in communication with the first computing device; and
   causing the first relationship table to be transmitted to the second computing device.

7. The method of claim 1, further comprising:
   receiving a request from the user to view a graphical visualization of relationships pertaining to the particular digital item; and
   providing the user with the graphical visualization, wherein the graphical visualization graphically represents at least one relationship captured in the first relationship table.

8. The method of claim 7, wherein the graphical visualization comprises icons that represent digital items and edges that represent relationships between digital items.

9. The method of claim 8, wherein the graphical visualization comprises graphical items that represent temporal information pertaining to actions undertaken on related digital items.

10. The method of claim 1, wherein an application that performs an operation on the particular digital object is configured to report relationship data that is included in the first relationship table.

11. The method of claim 1, wherein an operating system is configured to monitor applications executing on the first computing device, capture relationship data, and cause the relationship data to be included in the first relationship table.

12. The method of claim 1, further comprising:
    monitoring actions of the user over time with respect to the digital items on the first computing device; and
    updating the machine learning algorithm based at least in part upon the actions of the user.

13. A computing apparatus comprising:
    a processor; and
    a memory that comprises components that are executable by the processor, the components comprising:
      a monitor component that monitors action of a user with respect to digital items residing on the computing apparatus;
      a table builder component that builds a first relationship table based at least in part upon the action monitored by the monitor component, wherein the first relationship table comprises identities of digital items and identified relationships between the digital items; and
      an inference component that executes a machine learning algorithm over the first relationship table to generate at least one inference pertaining to a relationship corresponding to at least one digital item being focused upon by the user.

14. The computing apparatus of claim 13, wherein the inference generated by the inference component is utilized to notify the user of a relationship pertaining to the digital item being focused upon by the user.

15. The computing apparatus of claim 13, wherein the components further comprise a visualizer component that generates a graphical visualization of relationships pertaining to the at least one digital item being focused upon by the user based at least in part upon the first relationship table.

16. The computing apparatus of claim 13, further comprising a table analyzer component that aligns the first relationship table with a second relationship table to locate cross-device relationships between digital items residing on the computing apparatus and a second computing apparatus.

17. The computing apparatus of claim 16, wherein locating the cross-device relationships between digital items residing on the computing apparatus and the second computing apparatus comprises identifying that a first version of a digital item resides on the computing apparatus and a second version of the digital item resides on the second computing apparatus.

18. The computing apparatus of claim 13 being a portable computing device.

19. The computing apparatus of claim 13, wherein the inference component is updated through utilization of active learning.

20. A computer-readable memory comprising instructions that, when executed by a processor, cause the processor to perform acts comprising:
- monitoring actions of a user with respect to digital items residing on a first computing device;
- generating a first relationship table based at least in part upon the monitored actions of the user, wherein the relationship table comprises identities of digital items on the first computing device and relationships between the digital items on the first computing device;
- receiving a second relationship table that comprises identities of digital items on a second computing device and relationships between the digital items on the second computing;
- receiving a selection of at least one digital item that resides on the first computing device; and
- causing data to be displayed that indicates to the user that a certain digital item on the second computing device is related to the at least one digital item that resides on the first computing device.

* * * * *